(12) United States Patent
Maezawa

(10) Patent No.: US 10,671,331 B2
(45) Date of Patent: *Jun. 2, 2020

(54) INFORMATION PROCESSING DEVICE WITH A PROXIMITY COMMUNICATION DEVICE AND NON-TRANSITORY COMPUTER READABLE MEDIUM FOR EXECUTING A PROCESS FOR CONTROLLING THE SAME

(71) Applicant: FUJI XEROX CO., LTD., Tokyo (JP)

(72) Inventor: Toshiyuki Maezawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/451,614

(22) Filed: Jun. 25, 2019

(65) Prior Publication Data
US 2019/0317708 A1    Oct. 17, 2019

Related U.S. Application Data

(63) Continuation of application No. 15/648,606, filed on Jul. 13, 2017, now Pat. No. 10,372,390.

(30) Foreign Application Priority Data

Dec. 21, 2016  (JP) ................................. 2016-247332

(51) Int. Cl.
*G06F 3/12* (2006.01)
*G06F 21/00* (2013.01)
(Continued)

(52) U.S. Cl.
CPC .......... *G06F 3/1236* (2013.01); *G06F 3/1203* (2013.01); *G06F 3/1204* (2013.01);
(Continued)

(58) Field of Classification Search
CPC ...... G06F 3/1236; G06F 3/1203; G06F 3/128; G06F 3/1292; H04W 76/023;
(Continued)

(56) References Cited

U.S. PATENT DOCUMENTS 8,483,744 B2   7/2013  Takada et al.
9,063,689 B2   6/2015  Suzuki et al.
(Continued)

FOREIGN PATENT DOCUMENTS

JP       4894826 B2      3/2012
JP    2014-222865 A    11/2014
JP       5945965 B2      7/2016

OTHER PUBLICATIONS

Feb. 16, 2018 Office Action issued in U.S. Appl. No. 15/648,606.
(Continued)

*Primary Examiner* — Juan M Guillermety
(74) *Attorney, Agent, or Firm* — Oliff PLC

(57) ABSTRACT

An information processing device has at least one proximity communication device. The information processing device is an apparatus in which information in a storage area in the at least one proximity communication device is capable of being provided for an external apparatus. The information in the storage area is rewritten in accordance with transition of an apparatus state of the information processing device.

13 Claims, 5 Drawing Sheets

(51) Int. Cl.
  *H04B 5/00* (2006.01)
  *H04N 1/21* (2006.01)
  *H04N 1/00* (2006.01)
  *H04W 76/14* (2018.01)
  *H04W 4/80* (2018.01)

(52) U.S. Cl.
  CPC ............ *G06F 3/128* (2013.01); *G06F 3/1229* (2013.01); *G06F 3/1292* (2013.01); *H04B 5/0031* (2013.01); *H04N 1/00342* (2013.01); *H04N 1/2104* (2013.01); *H04W 4/80* (2018.02); *H04W 76/14* (2018.02); *H04N 2201/006* (2013.01); *H04N 2201/0041* (2013.01)

(58) Field of Classification Search
  CPC . H04W 4/008; H04N 1/00342; H04N 1/2104; H04N 2201/006; H04N 2201/0041; H04B 5/0031
  See application file for complete search history.

(56) References Cited

U.S. PATENT DOCUMENTS

| | | | |
|---|---|---|---|
| 9,335,957 | B2 | 5/2016 | Okamura |
| 9,647,728 | B2 | 5/2017 | Okamura |
| 2015/0002878 | A1* | 1/2015 | Naka ................. H04N 1/00891 358/1.14 |
| 2015/0038086 | A1 | 2/2015 | Kim |
| 2015/0096014 | A1* | 4/2015 | Terashita ................ G06F 21/35 726/20 |
| 2016/0054955 | A1* | 2/2016 | Nakamura ............ G06F 3/1292 358/1.14 |

OTHER PUBLICATIONS

Aug. 29, 2018 2018 Office Action issued in U.S. Appl. No. 15/648,606.

Mar. 21, 2019 Notice of Allowance issued in U.S. Appl. No. 15/648,606.

\* cited by examiner

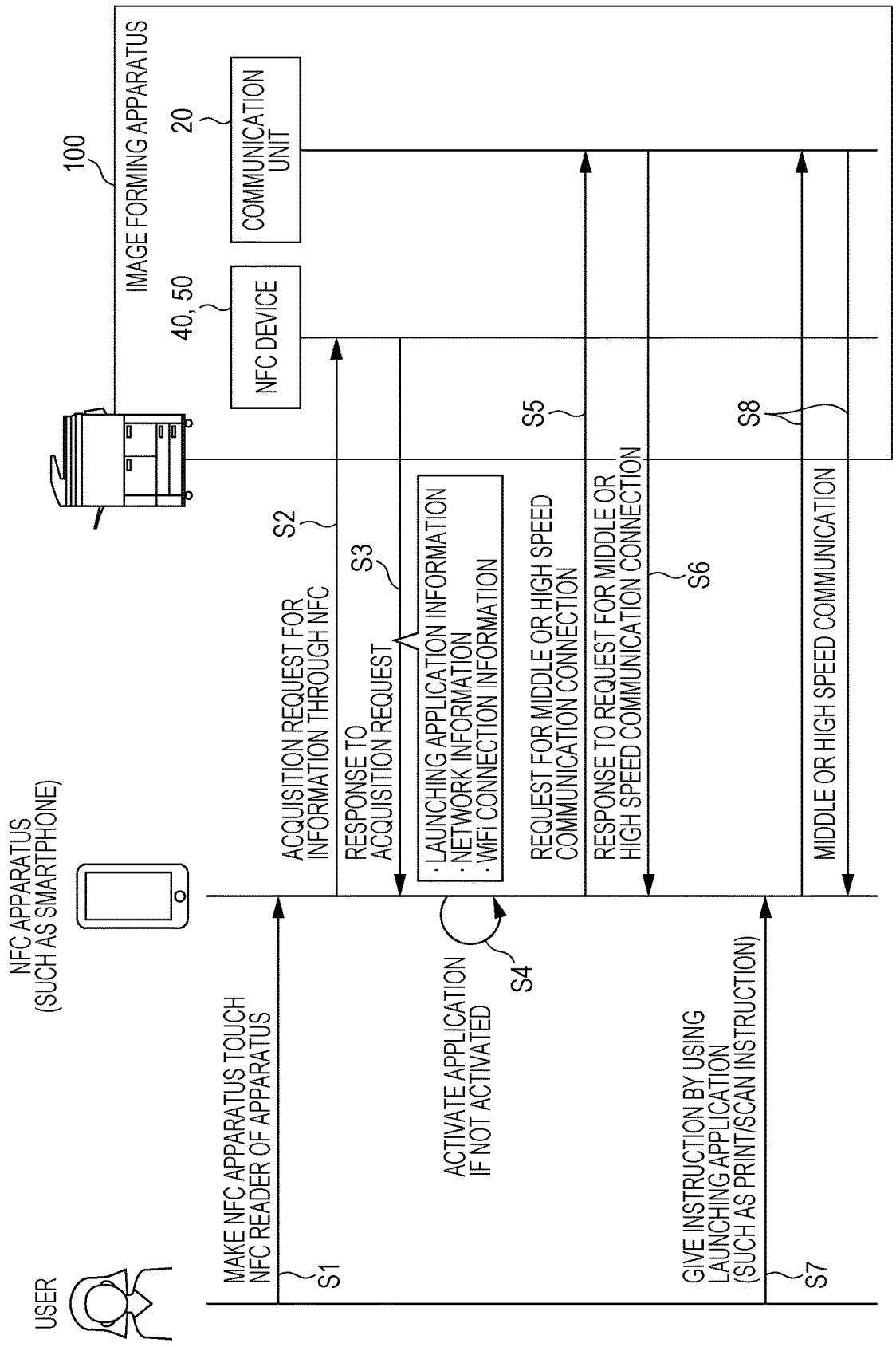

FIG. 4A
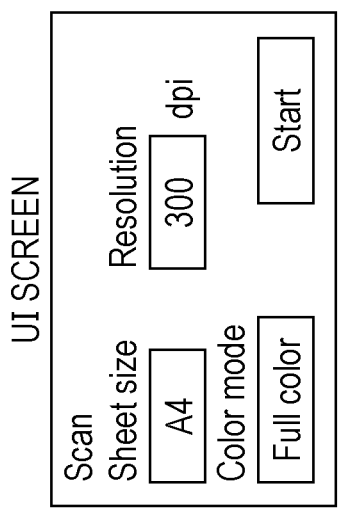
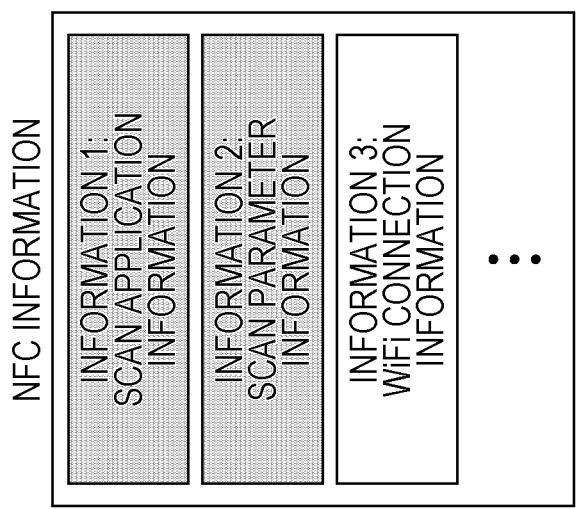
FIG. 4B
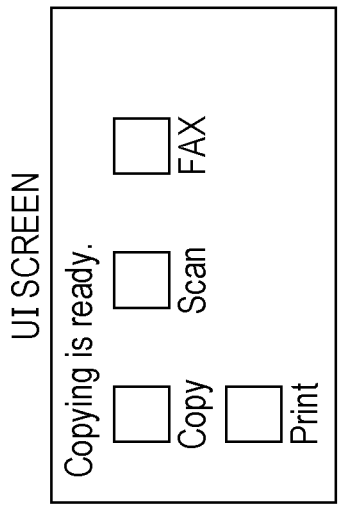
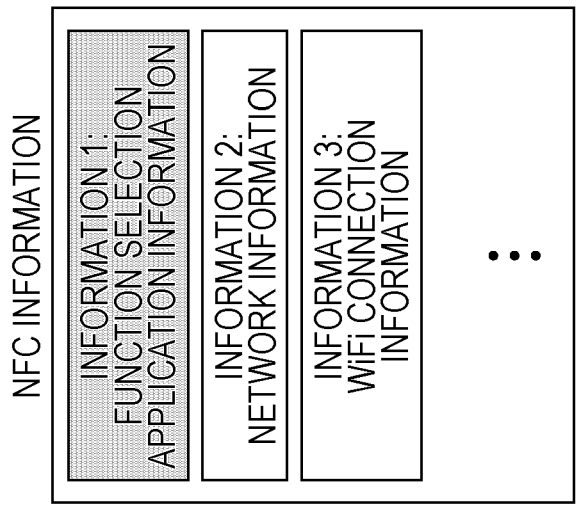
FIG. 4C
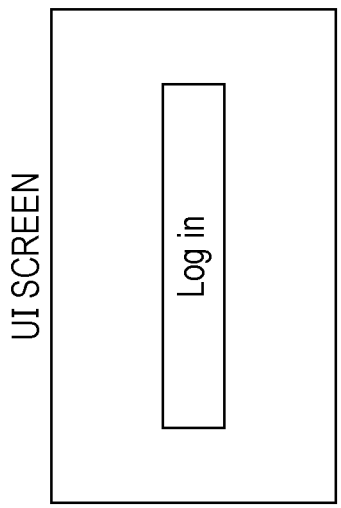
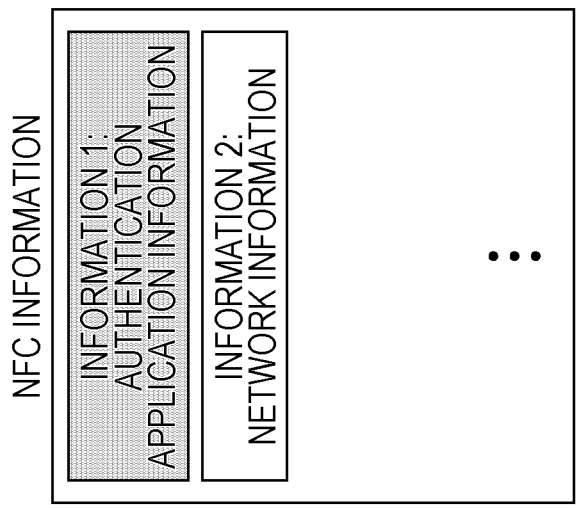

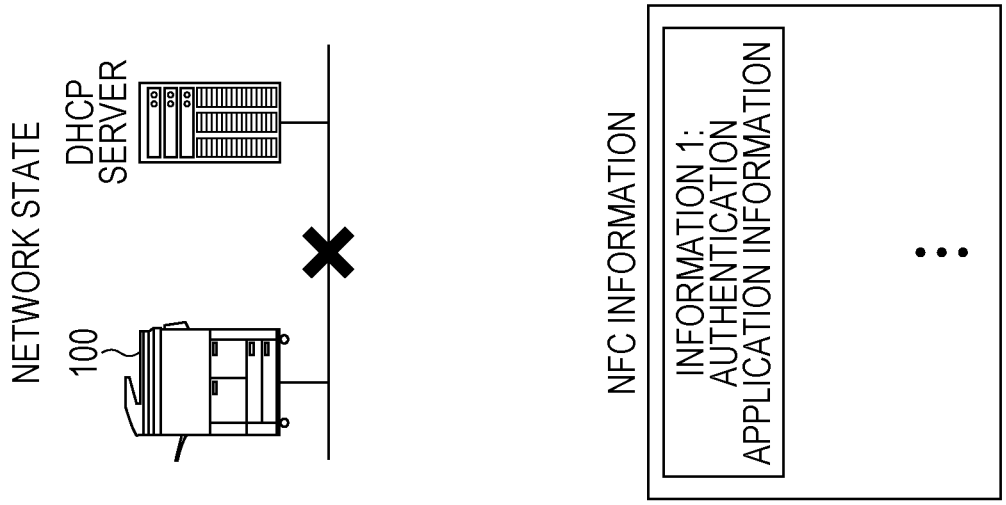
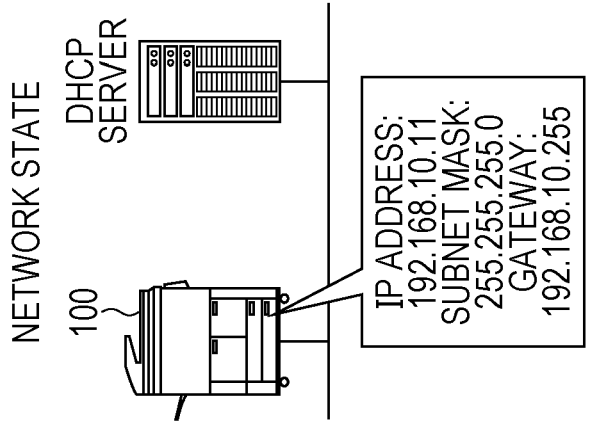
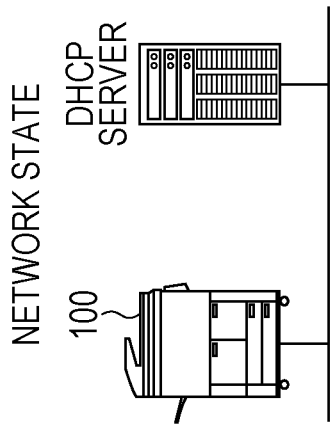

INFORMATION PROCESSING DEVICE WITH A PROXIMITY COMMUNICATION DEVICE AND NON-TRANSITORY COMPUTER READABLE MEDIUM FOR EXECUTING A PROCESS FOR CONTROLLING THE SAME

CROSS-RELATED REFERENCE TO RELATED APPLICATIONS

This is a Continuation of application Ser. No. 15/648,606 filed Jul. 13, 2017, which claims the benefit of Japanese Patent Application No. 2016-247332 filed Dec. 21, 2016. The disclosure of the prior applications is hereby incorporated by reference herein in its entirety.

BACKGROUND i) Technical Field

The present invention relates to an information processing device and a non-transitory computer readable medium.

(ii) Related Art

Portable terminals, such as smartphones, tablet terminals, and personal computers (PCs), which are provided with functions defined by near field communication (NFC) standards that are exemplary proximity communication standards have become widely used. In addition, information processing devicees provided with devices supporting NFC standards in order to receive/transmit information from/to the portable terminals through NFC are also known.

For example, with widespread use of proximity communication such as NFC, it is expected that an improved technique for an information processing device provided with a proximity communication device is introduced.

SUMMARY

According to an aspect of the invention, there is provided an information processing device having at least one proximity communication device. The information processing device is an apparatus in which information in a storage area in the at least one proximity communication device is capable of being provided for an external apparatus. The information in the storage area is rewritten in accordance with transition of an apparatus state of the information processing device.

BRIEF DESCRIPTION OF THE DRAWINGS

Exemplary embodiment of the present invention will be described in detail based on the following figures, wherein:

FIG. 3 is a diagram illustrating exemplary NFC communication performed by the image forming apparatus;

FIGS. 4A to 4C are diagrams illustrating a first example of rewriting NFC information; and FIGS. 5A to 5C are diagrams illustrating a second example of rewriting NFC information.

DETAILED DESCRIPTION

Figure 1:
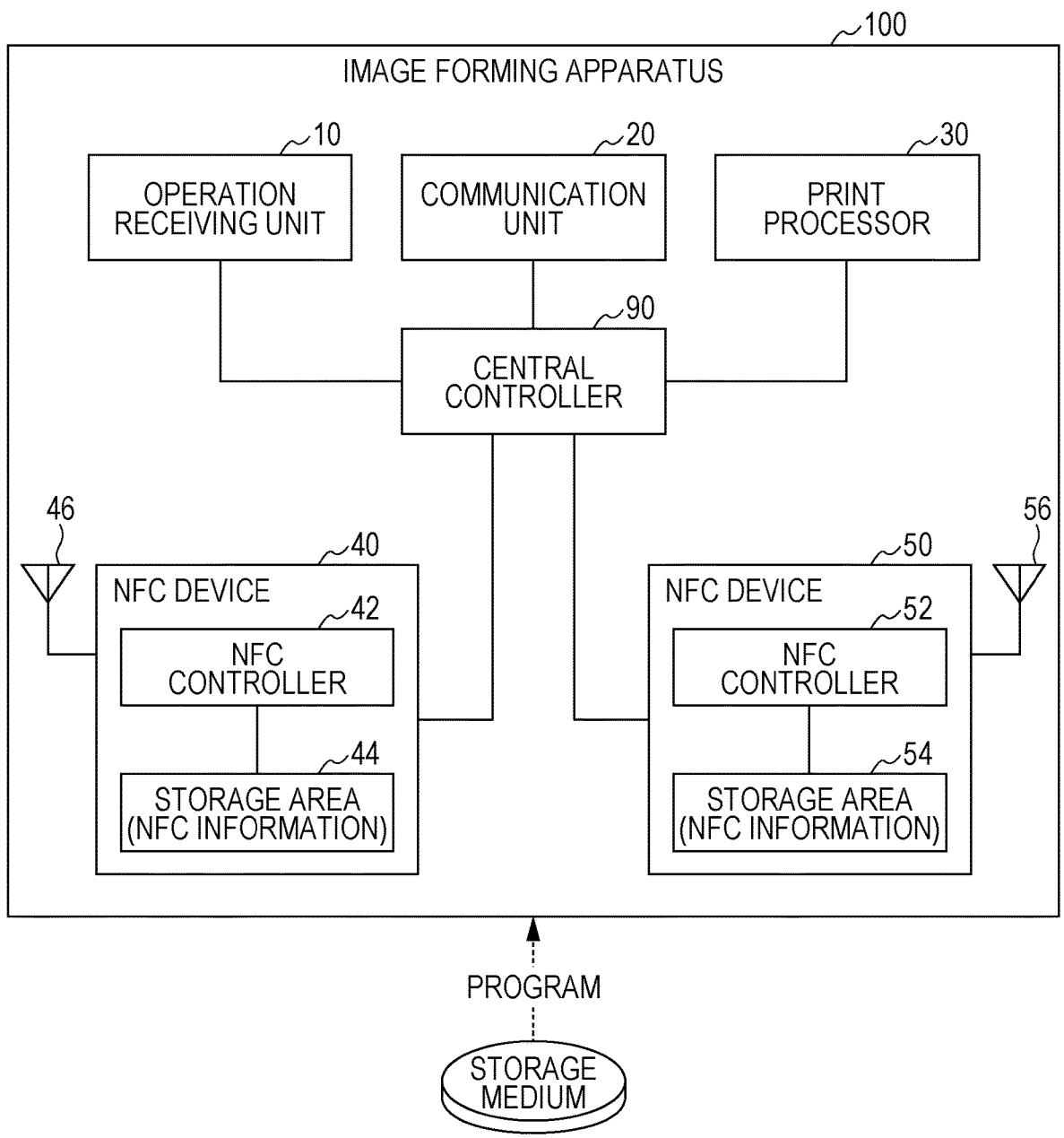
FIG. 1 is a diagram illustrating an exemplary image forming apparatus suitable for an exemplary embodiment of the present invention.

FIG. 1 is a diagram illustrating an exemplary image forming apparatus suitable for an exemplary embodiment of the present invention. An information processing device, such as the image forming apparatus 100 includes the units illustrated with reference numerals in FIG. 1, and implements a function of printing images (including an image containing only characters, numerals, and symbols) on print sheets.

An operation receiving unit 10 includes operation devices, such as a touch panel and switches, and receives operations from users using the image forming apparatus 100.

A communication unit 20 communicates with external apparatuses, such as smartphones, tablet terminals, and personal computers, that establish a communication connection with the image forming apparatus 100 through a communication line such as the Internet. In communication performed by the communication unit 20, a wired communication protocol may be used, or a wireless communication protocol, such as WiFi®, WiFi Direct®, or, Bluetooth®, may be used.

A print processor 30 performs printing according to print instruction information received by the operation receiving unit 10 or the communication unit 20. The print processor 30 prints image data indicated by the print instruction information, on print sheets. Print sheets are set, for example, on a paper feed tray.

The image forming apparatus 100 is provided with functions of proximity communication (encompassing near field wireless communication). Exemplary suitable proximity communication is near field communication (NFC). The image forming apparatus 100 includes multiple NFC devices 40 and 50 supporting an NFC standard(s).

Each of the NFC devices 40 and 50 communicates, in conformity with the NFC standard(s), with external apparatuses provided with NFC functions. An exemplary suitable NFC device 40 is an active NFC tag, and an exemplary suitable NFC device 50 is also an active NFC tag. An exemplary suitable external apparatus is a portable terminal, such as a smartphone, a tablet terminal, or a portable personal computer (PC).

The NFC device 40 includes an NFC controller 42, a storage area 44, and an antenna 46, and receives/transmits data from/to an external apparatus such as a portable terminal through wireless communication via the antenna 46. Data (NFC information) that is provided for an external apparatus (that may be read by the external apparatus) is stored in the storage area 44. The NFC controller 42 controls writing and reading of data in the storage area 44.

The NFC device 50 includes an NFC controller 52, a storage area 54, and an antenna 56, and receives/transmits data from/to an external apparatus such as a portable terminal through wireless communication via the antenna 56. Data (NFC information) that is provided for an external apparatus (that may be read by the external apparatus) is stored in the storage area 54. The NFC controller 52 controls writing and reading of data in the storage area 54.

The NFC device 40 is mounted, for example, in an integrated circuit (IC) card reader. The IC card reader or the like is connected to the apparatus body of the image forming apparatus 100, for example, by using Universal Serial Bus (USB), and is supplied with power from the apparatus body via USB. For example, during energization in which power is supplied from the apparatus body, data may be written and read in the storage area 44.

The NFC device 40 may be provided with functions as a passive tag in which, during non-energization in which no power is supplied from the apparatus body, data in the storage area 44 is provided for an external apparatus (may be read by the external apparatus) by using an induced current caused by radio waves obtained from the external apparatus. When the NFC device 40 functions as a passive tag, the NFC controller 42 is desirably capable of permitting or inhibiting reading of data in the storage area 44 which is performed by an external apparatus.

In contrast, for example, the NFC device 50 is provided for a substrate forming a touch panel or the like that is an exemplary suitable operation receiving unit 10. The NFC device 50 is supplied with power from the apparatus body via the substrate. For example, during energization in which power is supplied from the apparatus body, data may be written and read in the storage area 54.

The NFC device 50 is provided with functions as a passive tag in which, during non-energization in which no power is supplied from the apparatus body, data in the storage area 54 is provided for an external apparatus (may be read by the external apparatus) by using an induced current caused by radio waves obtained from the external apparatus. When the NFC device 50 functions as a passive tag, the NFC controller 52 is capable of permitting or inhibiting reading of data in the storage area 54 which is performed by an external apparatus.

A central controller 90 has overall control over the image forming apparatus 100. In the overall control exerted by the central controller 90, an instruction received from a user through the operation receiving unit 10 or the communication unit 20 is also reflected.

Examples suitable for the image forming apparatus 100 illustrated in FIG. 1 include a printer, a copier, and a facsimile (FAX). Further, a multi-function peripheral provided with multiple functions among a printer function, a copier function, and a facsimile function is also an exemplary suitable image forming apparatus 100.

The image forming apparatus 100 in FIG. 1 may be implemented, for example, by using a computer. The computer includes hardware resources, for example, a computing device such as a central processing unit (CPU), storage devices, such as a memory and a hard disk, a communication device that uses a communication line such as the Internet, a device that reads data from a storage medium, such as an optical disk or a semiconductor memory, and that writes data, a display device such as a display, and an operation device that receives operations from users.

For example, programs (software) corresponding to at least some functions (particularly, functions of the central controller 90) among the functions of the units designated with reference numerals in FIG. 1 are read into the computer. Through collaboration between the hardware resources included in the computer and the software that has been read, at least some of the functions provided for the image forming apparatus 100 are implemented by using the computer. The programs may be provided for the computer (the image forming apparatus 100), for example, via a communication line such as the internet, or may be provided for the computer (the image forming apparatus 100) by storing the programs in a storage medium such as an optical disk.

The overall configuration of the image forming apparatus 100 illustrated in FIG. 1 is described above. Functions or the like implemented by the image forming apparatus 100 in FIG. 1 will be described in detail. For the configuration (part) illustrated in FIG. 1, reference numerals in FIG. 1 will be used in the description made below.

Figure 2:
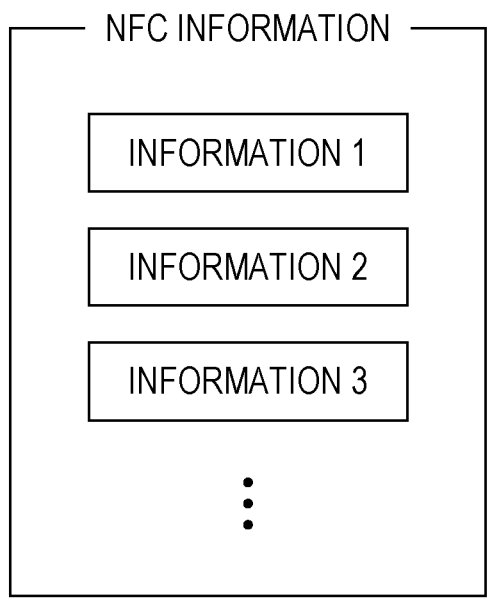
FIG. 2 is a diagram illustrating exemplary near field communication (NFC) information.

FIG. 2 is a diagram illustrating exemplary NFC information. FIG. 2 illustrates exemplary NFC information that is data stored in the storage areas 44 and 54 included in the NFC devices 40 and 50 in FIG. 1.

In the example illustrated in FIG. 2, NFC information includes pieces of information of information 1, information 2, information 3, etc. The NFC devices 40 and 50 are relatively inexpensive. For example, compared with a storage device with large storage capacity, such as a hard disk drive (HDD), the storage capacity of the storage areas 44 and 54 is very small. Therefore, it is not possible to store a large amount of NFC information in the storage areas 44 and 54.

FIG. 3 is a diagram illustrating exemplary NFC communication performed by the image forming apparatus 100. FIG. 3 illustrates a sequence followed when a user uses the image forming apparatus 100 through an NFC apparatus such as a smartphone provided with NFC functions.

A user touches an NFC reader of the image forming apparatus 100 with an NFC apparatus that is carried with the user (S1). That is, the NFC apparatus is held over the antenna 46 of the NFC device 40 or the antenna 56 of the NFC device 50 that functions as an NFC reader, enabling NFC communication between the NFC apparatus and the image forming apparatus 100 to be performed.

In this state, the NFC apparatus operates, for example, in the reader/writer mode, and data is received/transmitted from/to an active NFC tag included in the image forming apparatus 100, that is, the NFC device 40 or the NFC device 50.

For example, an acquisition request to acquire information through NFC communication is transmitted from the NFC apparatus to the image forming apparatus 100 (S2). The NFC apparatus reads information according to the acquisition request, that is, information stored in the storage area 44 of the NFC device 40 or the storage area 54 of the NFC device 50 (S3). Thus, for example, the NFC apparatus obtains launching application information, network information, middle or high speed communication connection information, and the like stored in the storage area 44 or the storage area 54. When the launching application has not been activated, the NFC apparatus activates the launching application corresponding to the launching application information (S4).

A connection request for middle or high speed communication is transmitted from the NFC apparatus to the image forming apparatus 100 (S5). If a connection may be established, a connection response for middle or high speed communication is transmitted from the image forming apparatus 100 to the NFC apparatus (S6). This enables middle or high speed communication having longer communication distance and higher communication speed compared with NFC communication to be performed between the communication unit 20 of the image forming apparatus 100 and the NFC apparatus. Exemplary suitable middle or high speed communication is WiFi®. Alternatively, wireless communication such as Bluetooth® may be used as middle or high speed communication.

When middle or high speed communication is enabled, the user gives an instruction to perform printing, scanning, or the like by using the launching application information contained in the NFC apparatus (S7), and data is transferred between the NFC apparatus and the image forming apparatus 100 through middle or high speed communication according to a user instruction (S8). Thus, the image forming apparatus 100 performs image forming processing, such as printing or scanning, according to a user instruction.

As in the example described by using FIG. 3, in NFC communication, for example, pieces of information, such as launching application information, network information, and middle or high speed communication connection information, stored in the storage area 44 or the storage area 54 are read by an NFC apparatus for use. However, since the storage capacity of the storage areas 44 and 54 is much smaller than that of a storage device with large storage capacity, such as a hard disk drive (HDD), it is not possible to write a large amount of NFC information in the storage areas 44 and 54 for storage. Therefore, the image forming apparatus 100 in FIG. 1 rewrites NFC information in the storage areas 44 and 54 in accordance with transition of the apparatus state.

For example, in transition of the apparatus state of the image forming apparatus 100, for example, during a transition or just before or after a transition, according to an instruction from the central controller 90, the NFC controller 42 rewrites NFC information in the storage area 44, and the NFC controller 52 rewrites NFC information in the storage area 54. Both of the NFC information in the storage area 44 and the NFC information in the storage area 54 may be rewritten. Alternatively, only one of the NFC information in the storage area 44 and the NFC information in the storage area 54, for example, only one piece of NFC information that is to be used by the NFC apparatus, may be rewritten.

FIGS. 4A to 4C are diagrams illustrating a first example of rewriting NFC information. FIGS. 4A to 4C illustrate an example of a user interface screen (UI screen) and NFC information. The user interface screen is the operation receiving unit 10 of the image forming apparatus 100 or a screen displayed on a display device of an NFC apparatus that performs NFC communication with the image forming apparatus 100. The NFC information is information stored in the storage area 44 or the storage area 54, and is read for use by an NFC apparatus through NFC communication.

FIG. 4A illustrates a state before a user logs in. In the state in FIG. 4A, a screen for prompting a user to log in is displayed on a user interface screen; authentication application information is stored as information 1 in the NFC information; and network information is stored as information 2. For example, when a user logs in by using an NFC apparatus into which authentication application information has been obtained, the apparatus state of the image forming apparatus 100 is changed from the state in FIG. 4A, for example, to the state in FIG. 4B.

FIG. 4B illustrates a state just after the user logs in. The user interface screen in FIG. 4B is a top screen just after login. For example, a list of functions of image forming processing which may be performed by the image forming apparatus 100 is displayed. In addition, in the login state in FIG. 4B, function selection application information is stored as information 1 of the NFC information; the network information is stored as information 2; and WiFi® connection information is stored as information 3.

For example, in the transition from the state in FIG. 4A to the state in FIG. 4B, the authentication application information stored as information 1 is replaced with the function selection application information, and the WiFi® connection information is added as information 3.

In the state in FIG. 4B, for example, when the user selects a scanning function by using the NFC apparatus into which the function selection application information has been obtained, that is, when the user touches (presses) a scan button on the user interface screen, the apparatus state of the image forming apparatus 100 is changed to a scanning state illustrated in FIG. 4C.

FIG. 4C illustrates the scanning state of the image forming apparatus 100. On the user interface screen in FIG. 4C, a list of various parameters for scanning is displayed. In the scanning state in FIG. 4C, scan application information is stored as information 1 of the NFC information; scan parameter information is stored as information 2; and the WiFi® connection information is stored as information 3.

For example, in the transition from the state in FIG. 4B to the state in FIG. 4C, the function selection application information stored as information 1 is replaced with the scan application information, and the network information stored as information 2 is replaced with the scan parameter information.

Through rewriting of NFC information described by using FIGS. 4A to 4C, information conforming to the apparatus state of the image forming apparatus 100 which is changed in accordance with user operations is provided for an NFC apparatus of a user. In particular, in a state in which a user logs in the image forming apparatus 100, for example, WiFi® connection information corresponding to an NFC apparatus of the user may be provided for the NFC apparatus as information for the user.

FIGS. 5A to 5C are diagrams illustrating a second example of rewriting NFC information. FIGS. 5A to 5C illustrate an example of a network state of the image forming apparatus 100 and NFC information. The network state is a network state between the image forming apparatus 100 and a dynamic host configuration protocol (DHCP) server. The NFC information is information stored in the storage area 44 or the storage area 54, and is read for use by an NFC apparatus through NFC communication.

In the state in FIG. 5A, the image forming apparatus 100 is connected to the DHCP server over a network, and authentication application information is stored as information 1 of the NFC information. In the state in FIG. 5A, when the image forming apparatus 100 obtains an Internet Protocol address (IP address) from the DHCP server, the apparatus state (network state) of the image forming apparatus 100 is changed, for example, to the state illustrated in FIG. 5B.

In the state in FIG. 5B, the image forming apparatus 100 has obtained an IP address and the like from the DHCP server; the authentication application information is stored as information 1 of the NFC information; and network information is stored as information 2. For example, in the transition from the state in FIG. 5A to the state in FIG. 5B, the authentication application information is continuously stored as information 1, and the network information, such as an IP address, a subnet mask, and a gateway, which is obtained from the DHCP server is added as information 2. When the network information such as an IP address obtained from the DHCP server is changed, information 2 is updated by using the changed network information.

FIG. 5C illustrates a state in which the image forming apparatus 100 fails to obtain an IP address and the like from the DHCP server due to network disconnection between the image forming apparatus 100 and the DHCP server or expiration of a lease of the DHCP. For example, in transition from the state in FIG. 5B to the state in FIG. 5C, the network information stored as information 2 of the NFC information is deleted.

Through rewriting of the NFC information which is described by using FIGS. 5A to 5C, changed network information of the image forming apparatus 100 is provided for an NFC apparatus of a user. For example, the latest IP address and the like obtained by the image forming apparatus 100 from the DHCP server may be provided for an NFC apparatus. In addition, when the image forming apparatus 100 fails to obtain an IP address and the like from the DHCP server, network information stored as NFC information is deleted, that is, invalid network information is deleted, hindering the network information from being provided to an NFC apparatus of a user.

The desirable exemplary embodiment of the present invention is described above. The above-described exemplary embodiment is merely exemplary in all points, and does not limit the scope of the present invention. The present invention encompasses various exemplary embodiments obtained through modification without departing from the nature of the present invention.

What is claimed is:

1. An information processing device comprising:
at least one proximity communication device configured to provide at least first information and second information in a storage area of the at least one proximity communication device to an external apparatus; and
a controller configured to:
rewrite the first information in the storage area in accordance with a transition of a first apparatus state of the information processing device caused by a first user input, and
rewrite the first information and the second information in the storage area in accordance with a transition of a second apparatus state of the information processing device caused by a second user input, wherein
the transition of the first apparatus state of the information processing device is a transition from a state before the user logs in to the information processing device or is a transition in which the information processing device is connected to a first network address, and
the transition of the second apparatus state of the information processing device is a transition that occurs after the user logs in, a transition in which the information processing device is connected to a second network or a transition in which a connection to a first network is deleted.

2. The information processing device according to claim 1,
wherein information conforming to the apparatus state of the information processing device is written for storage in the storage area.

3. The information processing device according to claim 2,
wherein in accordance with the transition of the first apparatus state, information for the user is written for storage in the storage area.

4. The information processing device according to claim 3,
wherein when connection information of the information processing device to a network is changed in accordance with the transition of the second apparatus state, the changed connection information is written for storage in the storage area.

5. The information processing device according to claim 2,
wherein when connection information of the information processing device to a network is changed in accordance with the transition of the first apparatus state or the transition of the second apparatus state, the changed connection information is written for storage in the storage area.

6. The information processing device according to claim 1,
wherein in accordance with the transition of the first apparatus state, information for the user is written for storage in the storage area.

7. The information processing device according to claim 6,
wherein when connection information of the information processing device to a network is changed in accordance with the transition of the first apparatus state or the transition of the second apparatus state, the changed connection information is written for storage in the storage area.

8. The information processing device according to claim 1,
wherein when connection information of the information processing device to a network is changed in accordance with the transition of the first apparatus state or the transition of the second apparatus state, the changed connection information is written for storage in the storage area.

9. The information processing device according to claim 1,
wherein the information processing device comprises a multi-function printing device.

10. A non-transitory computer readable medium storing a program causing a computer for an information processing device to execute a process, the information processing device comprising at least one proximity communication device configured to provide at least first information and second information in a storage area of the at least one proximity communication device to an external apparatus, the computer controlling the at least one proximity communication device, the process comprising:
rewriting the first information in the storage area in accordance with a transition of a first apparatus state of the information processing device caused by a first user input, and
rewriting the first information and the second information in the storage area in accordance with a transition of a second apparatus state of the information processing device caused by a second user input, wherein
the transition of the first apparatus state of the information processing device is a transition from a state before the user logs in to the information processing device or is a transition in which the information processing device is connected to a first network address, and
the transition of the second apparatus state of the information processing device is a transition that occurs after the user logs in, a transition in which the information processing device is connected to a second network or a transition in which a connection to a first network is deleted.

11. The non-transitory computer readable medium according to claim 10,
wherein the information processing device comprises a multi-function printing device.

12. An information processing device comprising:
at least one proximity communication device configured to provide at least first information in a storage area of the at least one proximity communication device to an external apparatus; and
a controller configured to:
rewrite the first information to include function selection information for selecting a function of the information processing device in the storage area in accordance with a transition of an apparatus state of the information processing device to a user logged-in state, and
rewrite the first information to include function application information for controlling a selected function in the storage area in accordance with a transition of an apparatus state of the information processing device to a state in which the information processing device performs the selected function.

13. The information processing device according to claim 12, wherein the information processing device comprises a multi-function printing device.

* * * * *